April 28, 1931. O. NELSON 1,802,982
NAME PLATE AND THE LIKE
Filed Feb. 6, 1930

Inventor:
Olof Nelson
By Mitchell, Chadwick & Kent,
Attorneys

Patented Apr. 28, 1931

1,802,982

UNITED STATES PATENT OFFICE

OLOF NELSON, OF ATTLEBORO, MASSACHUSETTS, ASSIGNOR TO THE ROBBINS COMPANY, OF ATTLEBORO, MASSACHUSETTS, A CORPORATION OF RHODE ISLAND

NAME PLATE AND THE LIKE

Application filed February 6, 1930. Serial No. 426,295.

This invention relates to improvements in name plates and the like. More particularly it relates to improved means for mounting name plates or other plate markers, or plate ornamentations, so as to be rigidly secured on a supporting structure.

It is a primary object of my invention to provide for the rigid securing of a plate on a support by means capable of being produced on principles of low-cost mass production. Another object is to employ a sheet-metal construction for said securing means, and yet attain a substantially non-yielding structure capable of being driven into the support to effect a tenacious, frictional inter-engagement between said securing means and the support, i. e. a driving fit. It is, moreover, an important feature that the supporting bearing of the plate on the support is that of one cylindrical surface in another, thereby ensuring relatively large friction surfaces, and adequate jar-proof support for the plate.

These objects and results may be attained by providing on the back of the name plate, as an integral part thereof, a short cylindrical ring of sheet metal, re-enforced and stiffened against transverse forces, by a web of sheet material; and by providing, in the support element, a cylindrical socket whose internal diameter corresponds exactly with the external diameter of the ring anchor. By applying pressure, the ring may be forced into the socket of the support, guided throughout by the cylindrical surfaces, and be rendered secure by the severe frictional inter-engagement between the outer surface of the ring and the inner surface of the socket. Extreme rigidity of mount results from the non-yielding character of the cylindrical support; and security of mount results from adequate cylindrical surfaces of severe frictional inter-engagement.

Figure 1:
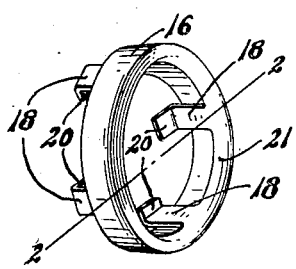
Figure 1 is a perspective of one form of my improved sheet-metal securing means.
Figure 2:
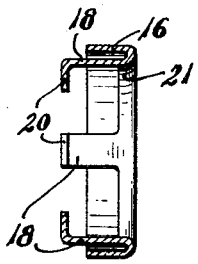
Figure 2 is a section on line 2—2 of Figure 1.
Figure 3:
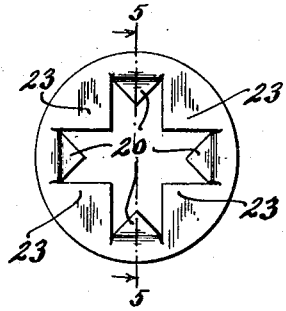
Figure 3 is a plan of another form of my securing means, embodying re-enforcing webs.
Figure 6:
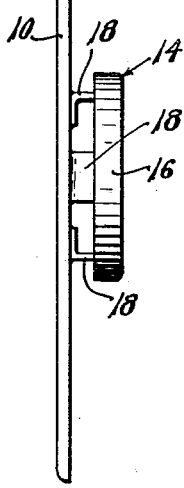
Figure 6 is a side elevation showing the securing means of Figure 3 attached to a plate.
Figure 7:
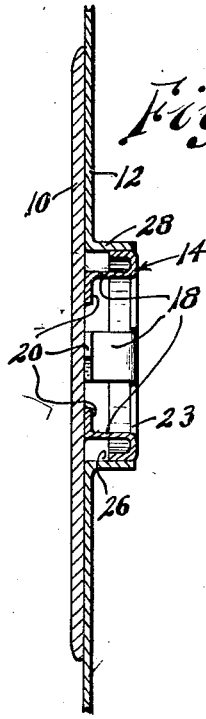
Figure 7 is a side elevation, in medial section, showing the plate supported and securely anchored on a supporting structure.
Figure 4:
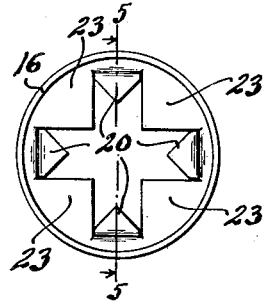
Figure 4 is a plan of the under side of the device of Figure 3.
Figure 5:
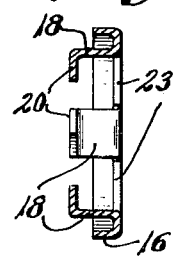
Figure 5 is medial section on line 5—5 of Figure 3.

Referring to the drawings, the plate 10 represents a metallic name-plate or other plate marker, or plate ornamentation, which it is desired to mount securely on the face of a supporting structure 12. For example, the support 12 may be a sheet metal part of an automobile, and the plate 10 may bear the maker's name.

According to my invention the plate 10 may be rigidly and securely mounted on a support by the pressing of the plate into severe frictional engagement with the support. To this end I provide on the rear face of plate 10, a projecting anchoring means indicated generally at 14. The anchor is of sheet-metal construction with a short cylindrical anchor-ring 16 supported on a plurality of arms 18 which extend axially of the cylinder 16 and terminate in feet 20 which may be spot welded or soldered to plate 10 to make the ring practically an integral part thereof. It may be formed, as in Figure 1, with a portion of the sheet material turned inwardly, as at 21, and with the arms 18 integral therewith. Or, if desired, it may be formed as shown in Figures 3 to 8 inclusive, wherein the arms 18 are pressed out of material within the ring 16, leaving webs 23 of the sheet material to serve as a re-enforcement and stiffener for the ring.

Figure 8:
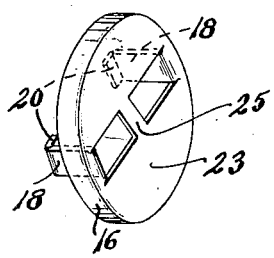
Figure 8 is a perspective of still another form of securing means.

Any desired number of arms 18 may be provided. In Figures 1 to 7 inclusive, four arms 18 are illustrated. This provides great rigidity and stiffness for the ring, especially in the form of Figures 3 to 7 inclusive, having the re-enforcing and stiffening webs 23. In Figure 8, only two arms 18 are shown, and a diametrical strut 25, in this form, constitutes a part of the web 23.

The support 12 is provided with a cylindrical socket 26, extending at right angles to the plane of the face of the support. Where the support is a sheet of metal, as herein represented, the socket 26 conveniently may be formed as a cylinder 28 by pressing a hole in the sheet at the desired location, and leaving a ring of rearwardly-extending, pressed sheet material encircling the hole. It is a feature of my invention that the internal diameter of the socket 26 corresponds exactly with the external diameter of the anchor-ring 16. As a result the ring is too large for manual insertion in the socket, but may be forced thereinto by the application of severe pressure. While being thus pressed into association with the support 12, the plate 10 is maintained in a proper relation to the support by the guiding tendency of the two inter-engaging cylindrical surfaces 16 and 26. And, because of the rigid character of both inter-engaging parts, both are substantially non-yielding under the stresses incident to installation. Once ring 16 is forced sufficiently into the socket to bring plate 10 against the support 12, the tenacity of frictional grip between the two engaging cylindrical surfaces ensures against its becoming loose, and against its removal except by application of a divisive force at least equal to the force required to accomplish the union. The connection depends not upon the yielding character of parts at or after insertion in a hole, or socket, but rather upon the accuracy of dimensions of inter-engaging parts.

A name plate mounted and secured according to my invention has substantial cylindrical support producing rigidity. Unlike the prior devices of this general type, there are no resilient spring parts employed, and relied upon for support or for security, which, at best, cannot accomplish rigidity, nor can they be free from possibility of working loose.

I claim as my invention:

1. Means for securing a plate, on a supporting structure, comprising a continuous cylindrical metal anchor-ring, having a plurality of legs extending from the anchor and rigidly secured to the rear face of the plate.

2. Means for securing a plate, on a supporting structure, comprising a cylindrical metal anchor-ring, having a plurality of legs extending from the anchor and rigidly secured to the rear face of the plate; stiffening webs between the said legs, the legs and webs resisting transverse flexing strains upon the ring, when in use.

3. Means for securing a plate on a socketed support, comprising the combination, with said plate and support, of a continuous cylindrical anchor-ring of size to engage, with a drive fit, in a socket of the support and a plurality of legs extending from the anchor and rigidly secured on the rear face of said plate, spacing apart the ring and plate, the legs resisting transverse flexing strains upon the ring, when in use.

4. Means for securing a plate on a socketed support, comprising the combination, with said plate and support, of a cylindrical anchor-ring of size to engage, with a drive fit, in a socket of the support, said ring being re-enforced interiorly by a web; and a plurality of legs extending from the anchor and rigidly secured on the rear face of said plate, spacing apart the ring and plate, the legs and webs resisting transverse flexing strains upon the ring, when in use.

Signed at Attleboro, Massachusetts, this 31st day of January, 1930.

OLOF NELSON.